(12) United States Patent
Stanciu et al.

(10) Patent No.: US 10,819,544 B2
(45) Date of Patent: Oct. 27, 2020

(54) SYMBOL DEMODULATOR WITH ERROR REDUCTION

(71) Applicant: NXP USA, Inc., Austin, TX (US)

(72) Inventors: Mihai-Ionut Stanciu, Bucharest (RO); Claudio Gustavo Rey, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/522,909

(22) Filed: Jul. 26, 2019

(65) Prior Publication Data

US 2020/0313943 A1 Oct. 1, 2020

(30) Foreign Application Priority Data

Mar. 29, 2019 (RO) .............................. A201900205

(51) Int. Cl.
*H04L 27/14* (2006.01)
*H04L 1/00* (2006.01)

(52) U.S. Cl.
CPC ............ *H04L 27/14* (2013.01); *H04L 1/0054* (2013.01)

(58) Field of Classification Search
CPC ....... H04L 27/156; H04L 27/16; H04L 27/14; H04L 27/1563

USPC .................................. 375/334, 350; 455/307
See application file for complete search history.

(56) References Cited

U.S. PATENT DOCUMENTS

| | | | |
|---|---|---|---|
| 7,508,890 B1 * | 3/2009 | Malone | H04L 7/007 |
| | | | 329/300 |
| 8,259,862 B2 | 9/2012 | Peng et al. | |
| 8,519,784 B2 | 8/2013 | Hafuka | |
| 9,729,364 B1 | 8/2017 | Rey | |
| 9,866,415 B1 * | 1/2018 | Rey | H04L 27/156 |
| 2013/0195229 A1 * | 8/2013 | Cheng | H04L 27/0014 |
| | | | 375/343 |

* cited by examiner

*Primary Examiner* — Khai Tran

(57) ABSTRACT

A demodulator and method includes a plurality of correlation circuits, a result combining stage, and a time combining stage. The plurality of correlation circuits may be configured to output a plurality of correlation values that indicate a likelihood of whether a pattern of a buffered portion of an input data signal matches a first plurality of target frequency behavior patterns. The plurality of correlation circuits may be further configured to output a plurality of delayed correlation values that indicate a likelihood of whether a pattern of a delayed buffered portion of the input data signal matches a second plurality of target frequency behavior patterns, where both the buffered portion and the delayed buffered portion include a current symbol.

20 Claims, 10 Drawing Sheets

SYMBOL DEMODULATOR WITH ERROR REDUCTION

TECHNICAL FIELD

This disclosure relates generally to demodulating binary information, and more specifically to demodulating frequency shift keying (FSK) signals.

BACKGROUND OF THE DISCLOSURE

When transmitting data between devices, the data must be transformed into a suitable signal form for being transmitted via the communication link between the devices, whether the link is a wired communication link or a wireless link. For wireless communication, transmission of data includes inserting the data to be transmitted onto a carrier signal (also referred to as modulating the data) for transmission over a wireless link, while receipt of data includes extracting the received data from the carrier signal (also referred to as demodulating the data).

During transmission and receipt of the modulated data signal, the data signal may suffer from interference, or distortion in which one part of the signal may affect one or more neighboring signals. The distortion caused by such interference often makes proper detection of a signal at a receiver difficult since the transition between adjacent signals is affected as neighboring signals "blur" into one another.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

It should be understood that the figures are merely schematic and are not drawn to scale. It should also be understood that the same reference numerals may be used throughout the figures to indicate the same or similar parts.

DETAILED DESCRIPTION

Figure 1:
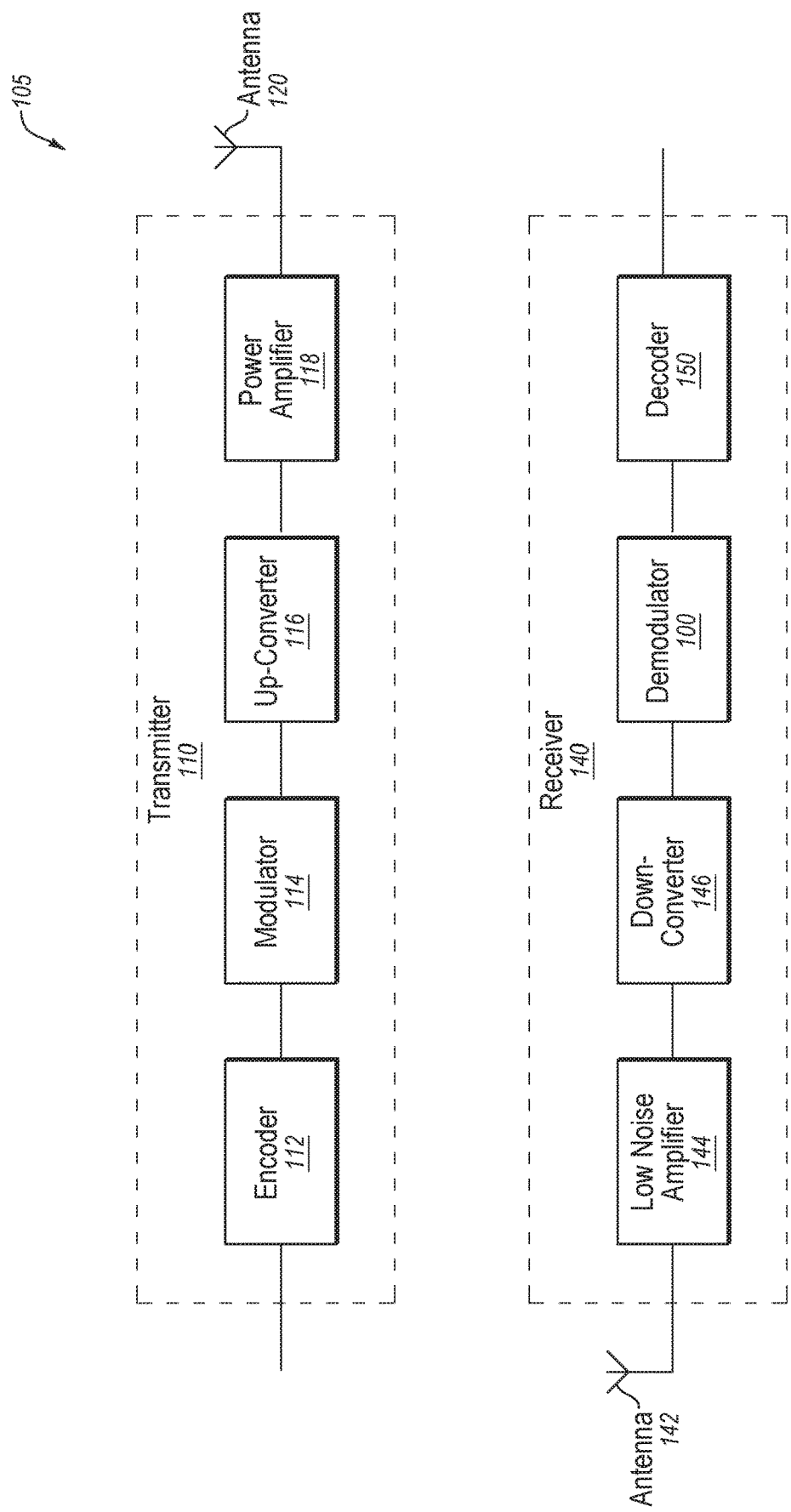
FIG. 1 illustrates a communication system for communicating digital data between two devices, in accordance with embodiments described herein.

A dynamically configurable symbol demodulator is disclosed and may be used for the reception of frequency shift keyed (FSK) modulated signals. The disclosed method may be reconfigured to address protocols that do not use spreading coding as well as the protocols that employ coding schemes such as time spreading and forward error correction coding. The method may be used in applications such as Bluetooth BLE 5, and may be extended to other types of protocols that present the aforementioned characteristics.

The disclosed demodulator and method adapts to the particularities of the demodulated packet, i.e., it exploits the typology of patterns being received or the statistical properties of the demodulated soft-bits, a priori known, to maximize the performance while minimizing the number of operations needed.

According to the various embodiments, a demodulator, such as a frequency shift keying (FSK) demodulator, is disclosed. The demodulator includes a plurality of correlation circuits, a result combining stage, and a time combining stage. The plurality of correlation circuits are configured to output a plurality of correlation values that indicate a likelihood of whether a pattern of a buffered portion of an input data signal matches a first plurality of target frequency behavior patterns. The plurality of correlation circuits is further configured to output a plurality of delayed correlation values that indicate a likelihood of whether a pattern of a delayed buffered portion of the input data signal matches a second plurality of target frequency behavior patterns, where both the buffered portion and the delayed buffered portion include a current symbol.

The result combining stage couples to the plurality of correlation circuits and is configured to output a set of maximum magnitude correlation values based on fewer than all of the plurality of correlation values and the plurality of delayed correlation values. The time combining stage couples to the result combining stage and may be configured to combine the set of maximum correlation values to produce a demodulation decision that returns a most likely symbol value for the current symbol.

Demodulation is based on a 2-level modulation, such as 2-level FSK where every arriving symbol is either a positive frequency deviation or a negative frequency deviation. The correlation may be computed two or three-bit patterns, where the two-bit patterns include X2 and M2 methods while the three-bit patterns include M3 methods.

The result combining stage may be further configured to ignore a value of the correlation values for ones of the first plurality of target behavior patterns that correspond to invalid sequences to form the less than all of the plurality of correlation values, and to ignore a value of the delayed correlation values for ones of the second plurality of target behavior patterns that correspond to invalid sequences to form the less than all of the plurality of delayed correlation values. Further, the demodulator may identify invalid sequences based on ones of the first plurality of target frequency behavior patterns and ones of the second plurality of target frequency behavior patterns matching invalid sequences of the input data signal when the input data signal has been spread with a spreading code.

The result combining stage of the demodulator may further be configured to ignore a value of the correlation values for ones of the first plurality of target behavior patterns and second target behavior patterns that correspond to invalid combinations of sequences to further form the less than all of the plurality of correlation values and the less than all of the plurality of the delayed correlation values.

The result combining stage may alternatively be configured to combine ones of the plurality of correlation values with ones of the plurality of delayed correlation values that form valid combinations of sequences, and output a set of maximum correlation values based on the ones of the plurality of correlation values with ones of the plurality of delayed correlation values that form valid combinations of sequences.

The combining of correlation values may be done according to a hypothesis. For example, a hypothesis may be that of a one or a zero is received at the third or "current symbol" for the non-delayed and at the first symbol for the values to be delayed. Further, the results may be combined in time as shown below with respect to FIG. 6.

Generally, not all combinations of data are valid under certain conditions. For example, if data is known to be repeated so that all symbols arrive in pairs, then there are combinations that need not be considered. For example, such a method requires comparing:

Max(abs($W000+W000d, W000+W001, \ldots W110+W011d$)) and

Max(abs($W111+W111d, W111+W110, \ldots W001+W100d$))

The largest will estimate the received sequence. For example, if the largest is $W110+W011d$, then the winning hypothesis is that 11011 arrived, then according to the design, all symbols may be duplicated resulting in an illegal pattern and should have been disqualified and not inserted into a Max operation. Stated another way, if symbols are repeated, then the only ones to consider are:

Max(abs($W000+W000d, W000+W001, W000+W011, W100+W000d, \ldots$)) and

Max(abs($W111+W111d, W111+W110, W111+W100, W011+W111d, \ldots$)).

A method of demodulating is also disclosed. The demodulating method may include generating a plurality of correlation values that indicate a likelihood of whether a pattern of a buffered portion of an input data signal matches a first plurality of target frequency behavior patterns. The demodulating method further includes generating a plurality of delayed correlation values that indicate a likelihood of whether a pattern of a delayed buffered portion of the input data signal matches a second plurality of target frequency behavior patterns, the buffered portion and the delayed buffered portion including a current symbol.

A set of maximum correlation values based on less than all of the plurality of correlation values and the plurality of delayed correlation values are outputted, and the set of maximum correlation values are combined to produce a demodulation decision that returns a most likely symbol value for the current symbol. Outputting the set of maximum correlation values may further include ignoring or excluding a value of the correlation values for ones of the first plurality of target behavior patterns that correspond to invalid sequences to form the less than all of the plurality of correlation values, and ignoring or excluding a value of the delayed correlation values for ones of the second plurality of target behavior patterns that correspond to invalid sequences to form the less than all of the plurality of delayed decorrelation values.

Additionally, the outputting may further include ignoring or excluding a value of the correlation values for ones of the first plurality of target behavior patterns and second target behavior patterns that correspond to invalid combinations of sequences to further form the less than all of the plurality of correlation values and the less than all of the plurality of the delayed correlation values.

Alternatively, the outputting may include combining ones of the plurality of correlation values with ones of the plurality of delayed correlation values that form valid combinations of sequences, and outputting a set of maximum correlation values based on the ones of the plurality of correlation values with ones of the plurality of delayed correlation values that form valid combinations of sequences.

Modulation and demodulation schemes are often defined in standards associated with particular wireless communication technologies. In frequency modulation approaches, for example, changes in the frequency of a transmitted signal are used to communicate information. For transmissions made in accordance with the IEEE 802.15.1 standard or BLUETOOTH standard, techniques such as frequency shift keying (FSK) are used to modulate and demodulate transmitted data signals.

In frequency shift keying (FSK) modulation schemes, a particular carrier frequency is defined. For example, the carrier frequency Fc of BLUETOOTH communications (e.g., BLUETOOTH Low Energy or BLE transmission) may be around 2.4 gigahertz (GHz). For 2-FSK (or two level FSK), a data value of '1' is then represented by the transmission of an analog pulse having a symbol frequency that exceeds the carrier frequency by some frequency deviation (also referred to as a positive frequency F1). Conversely, a data value of '0' is represented by the transmission of an analog pulse having a symbol frequency that is less than the carrier frequency by some frequency deviation (also referred to as a negative frequency −F1).

In some embodiments, the frequency deviation of the positive frequency F1 away from the carrier frequency Fc is the same in magnitude as the frequency deviation of the negative frequency −F1 away from the carrier frequency Fc (where the carrier frequency is centered between frequencies F1 and −F1). The frequency deviation may be within a range of 10 kilohertz (kHz) to 250 kHz. It is noted that the difference between the frequencies F1 and −F1 is referred to as the frequency shift. It is also noted that FSK modulation schemes may or may not filter the frequency signal. For example, BLE uses Gaussian filtering and its filter is configured to have a BT (or BT product, where B is bandwidth of the filter and T is symbol duration) of 0.5 and a frequency deviation of 250 kHz. FSK modulation may be used around 2.4 GHz, but is also commonly used in sub-GHz frequencies with deviation from a few Hertz to half a MHz or beyond. Other FSK modulations use other forms of filtering such as raised cosine filtering or no filtering at all.

Different FSK techniques can be used to modulate different amounts of digital data. As noted above, in 2-FSK (or two level FSK) systems, two symbol frequencies are defined (e.g., −F1 and F1) where each frequency represents a different one of the following data values: 0 and 1. In 4-FSK (or four level FSK) systems, four symbol frequencies (e.g., −F2, −F1, F1, F2, also referred to as F0, F1, F2, and F3) are defined where each frequency represents a different one of the following data values: 00, 01, 10, and 11, where a second (larger) frequency deviation is used to define a second positive frequency F2 and a second negative frequency −F2 from the carrier frequency. In this manner, 8-FSK, 16-FSK, and the like can be implemented to transmit varying amounts of data represented by different symbol frequencies.

During transmission and receipt of the FSK modulated data signal, the data signal may suffer from intersymbol interference, or distortion in which one symbol interferes with one or more neighboring symbols. Common causes of intersymbol interference include multipath propagation and filter bandwidths. The distortion caused by intersymbol interference often makes proper detection of symbols at a receiver difficult since the transition between symbols is affected (e.g., neighboring symbols affect each other or "blur" into one another).

The contextual demodulator evaluates portions of the input data signal and generates previous correlation results and future correlation results, which provide context for making a present decision for a current symbol encoded in an FSK modulated input data signal. The previous correlation results are based on a portion of the input data signal that encodes a current symbol and one or more preceding (or past) symbols, and the future correlation results are based on a portion of the input data signal that encodes the current symbol and one or more following (or next) symbols. Since each encoded symbol affects one or more subsequently received symbols, the correlation results generated by the contextual demodulator are combined in a time-wise manner, where the previous correlation results reinforce the future correlation results.

Each future and previous correlation result has a magnitude (or a magnitude squared) that indicates a likelihood of the current symbol being a particular symbol value, such as '0' or '1' in a 2-FSK embodiment, or '0', '1', '2', or '3' in a 4-FSK embodiment. The strength (e.g., weak or strong) of the likelihood is dependent on the size of the correlation result's magnitude. For example, a previous and a future correlation result may each strongly indicate a same symbol value for the current symbol, where the combined correlation result has a larger magnitude than the individual previous and future correlation results, indicating a greater likelihood or probability of the current symbol having the same symbol value.

Thus, the previous and future correlation results are reinforcing. In another example, one of the previous and future correlation results may weakly indicate one symbol value, and the other of the previous and future correlation results may strongly indicate another symbol value. Such previous and future correlation results are still reinforcing, although the combination of the previous and future correlation results produces a combined correlation result having a magnitude reflecting a difference between the previous and future correlation results, which indicates the likelihood of the current symbol having the strongly indicated symbol value. A present demodulation decision is generated based on the combination of previous and future correlation results, where the demodulation decision returns the most likely symbol value as the current symbol.

The demodulator, when correlating blurred symbols, may incorrectly select a symbol sequence thereby becoming a source for errors in the receive path. Further, the symbols may be transmitted with known spreading codes which provide coding gain for the signal. When the symbols are transmitted with known spreading codes, there are certain received symbol sequences that are expected and other symbol sequences that are invalid.

The present disclosure provides a contextual demodulator configured to make demodulation decisions based on pattern correlation results generated based on an input data signal, combined with techniques for reducing the introduced demodulator errors by marginalizing invalid symbol sequences when decoding a spread sequence of symbols.

FIG. 1 illustrates a communication system 105 that includes a transmitter 110 and a receiver 140. The transmitter 110 includes an encoder 112, a modulator 114, an up-converter 116, a power amplifier 118, and an antenna 120. The receiver 140 includes an antenna 142, a low noise amplifier (LNA) 144, a down converter 146, a contextual demodulator 100 like that discussed below, and a decoder 150. Other elements may also be included in transmitter 110 and receiver 140.

During operation of transmitter 110, digital data to be transmitted to receiver 140 of a receiving device is provided to encoder 112. Encoder 112 is configured to encode the digital data into a form suitable for modulation by modulator 114. For example, encoder 112 may implement a voice or image codec that translates the digital data into a binary data stream. In some embodiments, encoder 112 is also configured to implement an error correction scheme to transform the binary data stream into a form suitable for detecting channel errors that may occur during data transmission, such as by adding redundancy bits, for example using a code spreader, to the binary data stream.

The output of encoder 112 is provided to modulator 114, which is configured to implement an FSK modulation scheme (such as 2-FSK or 4-FSK and the like, as noted above) for converting the binary data stream into an analog signal form suitable for transmission to receiver 140, such as on a wireless medium. In some embodiments, the modulator 114 (and demodulator 100) implement a non-coherent FSK modulation scheme. Modulator 114 is configured to translate bits of the binary data stream into a stream of data symbols, where a data symbol S is an analog pulse waveform having a frequency (e.g., in baseband) and persisting for a duration of time, also referred to as symbol duration time period T.

It is noted that the phrase "symbol duration period T" used herein generally indicates the amount of time represented by the symbol duration time period T, while the phrase "symbol time period T" used herein generally indicates a particular instance of the symbol duration time period T. The modulation scheme defines a set of symbols and a set of frequencies, where each symbol represents one or more bits and each symbol itself is represented by a corresponding frequency, also referred to herein as a symbol frequency.

In some embodiments, modulator 114 may include a voltage controlled oscillator (VCO) that is controlled to generate an analog pulse (persisting for symbol duration period T) at the various symbol frequencies, in order to produce an analog signal encoded with data symbols at a known data symbol rate, where the data symbols correspond to the binary data stream.

The output of modulator 114 is provided to up-converter 116, which is configured to translate the analog signal (e.g., in baseband) to the radio frequency in which bandwidth has been allocated for the transmission. The output of up-converter 116 is provided to power amplifier 118, which amplifies the power of the analog signal to a sufficient amount to transmit the analog signal to receiver 140 via antenna 120.

At the receiver 140, a radio frequency (RF) analog signal is received at antenna 142 and is provided to LNA 144, which is configured to amplify the RF signal. This amplification step can be useful as the RF signal may have been attenuated through the transmission of the signal from one device to another. The RF signal is therefore enhanced in LNA 144 such that it is at a level suitable for further handling by the remaining elements of receiver 140. The output of LNA 144 is provided to down converter 146, which is configured to convert the analog signal from its allocated transmission bandwidth to a predetermined bandwidth (e.g., in baseband).

The output of down converter 146 is provided to contextual demodulator 100, which is configured to implement an FSK demodulation scheme that is the counterpart to the FSK modulation scheme implemented in modulator 114. Examples of demodulator 100 include demodulators 200, 600, 700, 900, and 1000, as further discussed below. The demodulator 100 is configured to recover data symbols from the analog signal, as also further discussed below.

In some embodiments, demodulator 100 also includes a translation circuit configured to convert each recovered data symbol into its corresponding bits (e.g., in embodiments where each data symbol represents two or more bits), in order to produce the corresponding binary data stream. The output of demodulator 100 is provided to decoder 150, which is also configured to detect and correct errors of the binary data stream according to the error correction scheme also utilized by encoder 112. Decoder 150 may also be configured to remove redundancy bits from the binary data stream. Decoder 150 is also configured to decode the binary data stream into digital data, as counterpart to the format utilized by encoder 112.

Demodulator 100 is configured to receive an input data signal (such as the analog signal provided by down converter 146), which potentially contains an FSK-modulated data signal encoded with one or more data symbols. The input data signal has a known data symbol rate at which the data symbols have been encoded into the input data signal, where each data symbol represents one or more bits. For example, the input data signal may have a data symbol rate equivalent to a 1 mega bits per second (Mbps) data rate. The data symbol rate may translate to a different data bit rate (e.g., less than the data symbol rate), depending on the modulation scheme utilized to modulate the signal, the error correction scheme utilized, and the quality of signal reception.

Among other components, contextual demodulator 100 includes a number of correlators, where each correlator is configured to identify and recover a received analog signal (such as a signal encoded with data symbols) in the presence of noise. Each correlator receives the input data signal and processes the signal at a particular rate, referred to as the oversampling rate. As used herein, the oversampling rate is the ratio of the sample rate at the receiver demodulator over the symbol rate, where the symbol rate is the rate at which the original symbols were generated. In some embodiments, the oversampling ratio is 8 samples per symbol, while the oversampling ratio is 4 samples per symbol in other embodiments. Other oversampling ratios may be utilized in other embodiments. Examples of demodulator 100 are further discussed below, in connection with FIGS. 200, 600, 700, 900, and 1000.

Figure 2:
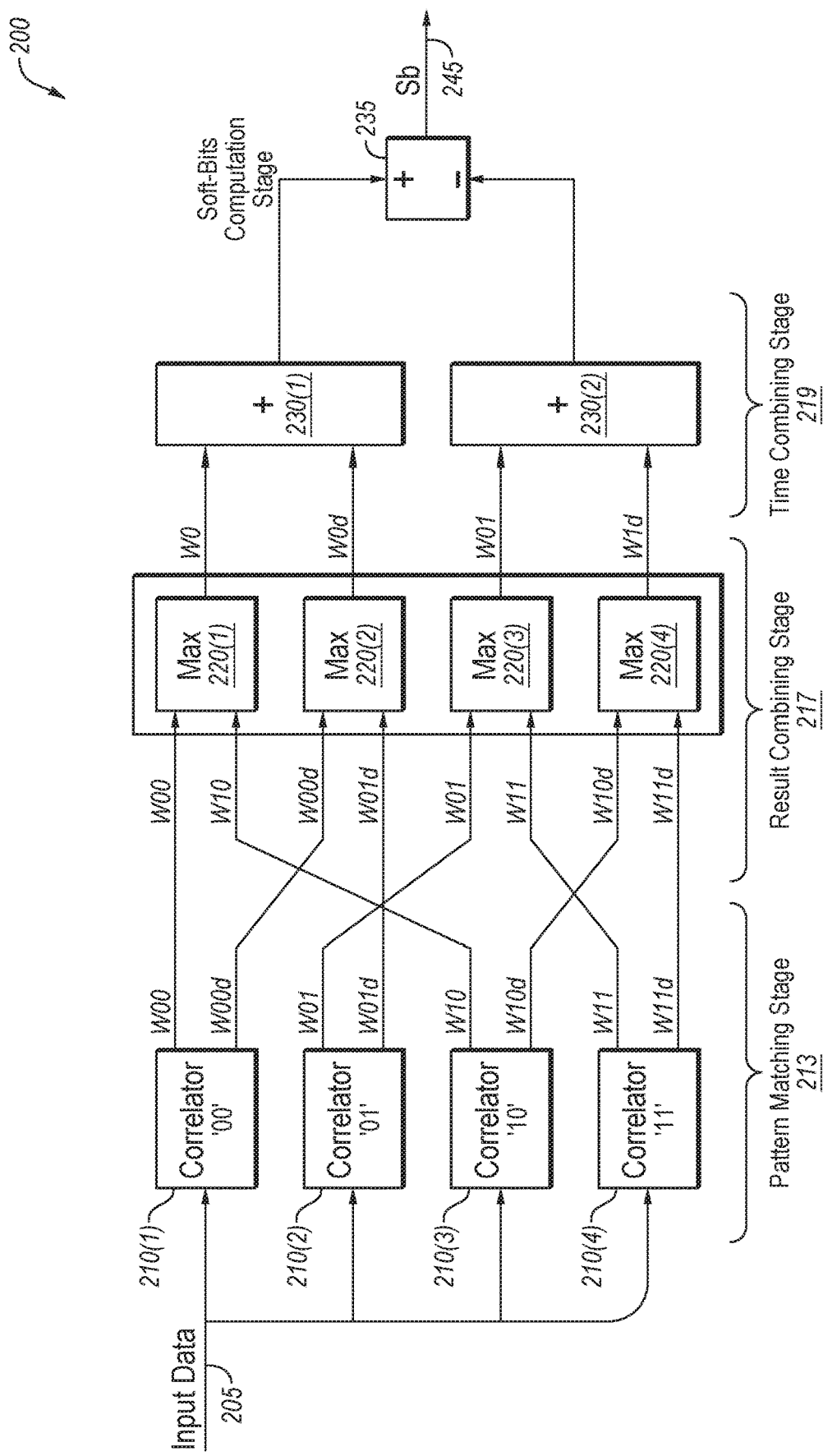
FIG. 2 illustrates a block diagram depicting an example demodulator for frequency shift keying (FSK), in accordance with embodiments described herein.

FIG. 2 illustrates a block diagram depicting an example demodulator 200 for 2-FSK, which may be included in a receiver system or combination transmitter and receiver system (or transceiver system) like that shown in FIG. 1. Demodulator 200 includes correlators 210(1)-(N), MAX selection blocks 220(1)-(N), and adders 230(1)-(N). The correlators 210(1)-(N) form a pattern matching stage 213, and MAX selection blocks 220(1) and 220(2) form a result combining stage 217, and adder blocks 230(1) and 230(2) form a time combining stage 219. It is also noted that correlators 210(1)-(N) of pattern matching stage 213 are configured to perform behavior pattern matching, as further described herein. These components are further discussed below.

Figure 3:
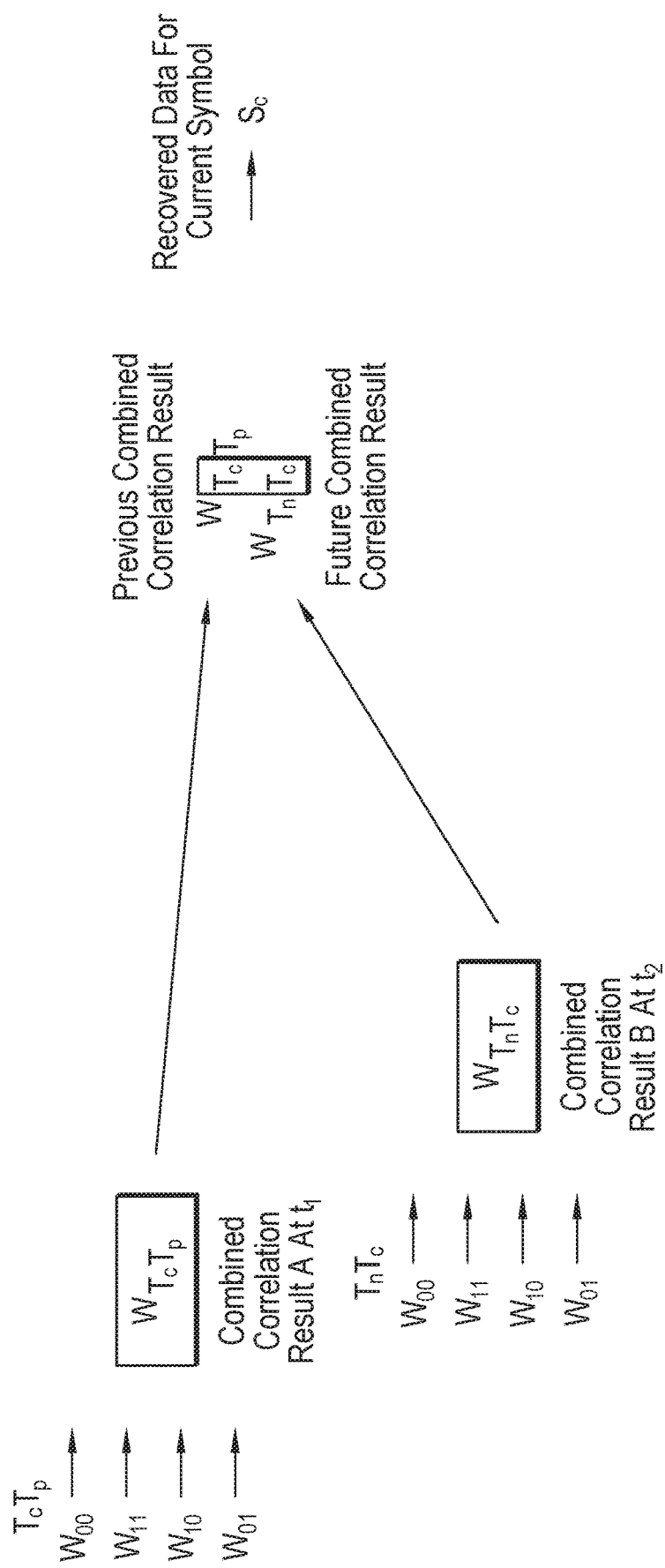
FIG. 3 illustrates a demodulator, in accordance with embodiments described herein.

Demodulator 200 is configured to produce demodulation decisions, an example of which is illustrated in FIG. 3. Correlators 210(1)-(N) (illustrated in FIG. 3 as W00, W11, W10, and W01) are configured to sequentially sample a buffered portion of an input data signal 205 over a sampling period spanning at least two symbol time periods (or 2T). Correlators 210(1)-(N) are also configured to output correlation signals that, when combined by the demodulator 200 using power combining as described below, produce a demodulation decision for the value of the current symbol Sc based on frequency behavior patterns detected over Tn, Tc, and Tp portions of the input data signal, where the demodulation decision returns the most likely symbol value for the current symbol Sc, which is either '0' or '1'.

On the left side of FIG. 3, correlators W00, W11, W10, and W01 each sample the input data signal over Tc and Tp and output correlation signals indicating a likelihood of whether the frequency over the Tc and Tp portions of the input data signal matches the correlator's respective frequency behavior pattern. The signal power of those signals (used as correlation values, as described below) are combined by the demodulator and represented as a combined correlation result A (or simply "result A") made at time t1 in the top branch of FIG. 3. When correlators receive a next Tn portion of the input data signal 205, the correlators sample the input data signal 205 over Tn and Tc and output correlation signals that indicate a likelihood of whether the frequency over the Tn and Tc portions of the input data signal matches the correlator's respective frequency behavior pattern. The signal power of those signals are combined by the demodulator and represented as a combined correlation result B (or simply "result B") made at time t2 in the bottom branch of FIG. 3, where time t2 is at least one symbol time period T after time t1. Result A is stored (or delayed) until result B is made in order to align the results for proper combination for the current symbol, which is overlapped by both results. Since result A is based in part on past symbol time period Tp, result A is considered a "previous" result A. Similarly, since result B is based in part on the next symbol time period Tn, result B is considered a "future" result B. Previous result A is added with future result B to produce an overall combined result (e.g., soft data) having a magnitude that indicates the most likely symbol value of the current symbol Sc. The most likely symbol value (as indicated by the combined result) is returned as the demodulation decision.

The previous and future results A and B each indicate a likelihood (e.g., strong or weak) of whether the current symbol value is '0' or '1'. The previous and future results A and B are cumulative, where the previous result reinforces the future result. For example, if the previous and future results both indicate a likelihood of a same symbol value for Sc, the previous and future results have a common sign (either positive or negative, based on the power combining) and the magnitudes of the previous and future results are additive to result in a combined result having a larger magnitude that confirms the indicated symbol value for Sc. If the previous and future results indicate likelihoods of different symbol values for Sc, the previous and future results have differing signs and the magnitudes of the previous and future results are subtractive, where the overall combined result depends on the result that has the larger magnitude. For example, if one result (previous or future) has a small magnitude that weakly indicates a '0' and the other result (future or previous) has a large magnitude that strongly indicates a '1', the '1' is determined to be the most likely current symbol value.

It is also noted that the correlators' sampling of the buffered portion of the input data signal over time periods Tc and Tp is referred to herein as a first sampling iteration at a first sample time t1, and the correlators' sampling of the buffered portion of the input data signal over time periods Tn and Tc is referred to herein as a second sampling iteration at a second sample time t2. Together, these two iterations of the correlators' sampling process form a framework on which a demodulation decision for Sc is based, where this framework moves or shifts on each sampling iteration to align Tn with the most recently received portion of the input data signal for a subsequent demodulation decision.

Figure 4:
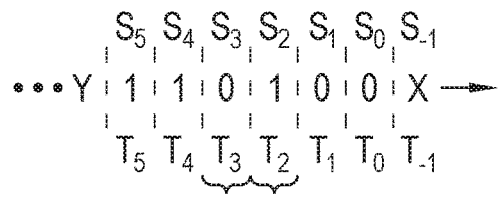
FIG. 4 illustrates the movement of this framework as an example input data signal encoding a sequence of symbols, in accordance with embodiments described herein.
Figure 4:
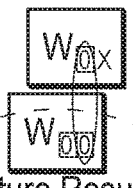
Figure 4:
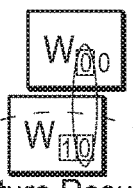
Figure 4:
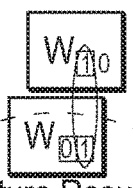
Figure 4:

FIG. 4 illustrates the movement of this framework as an example input data signal encoding a sequence of symbols S0-S5 (e.g., X001011Y) over a respective one of time periods T0-T5 is received by demodulator 100. The order of the sequence is illustrated from right to left to show receipt time order (or the order in which the demodulator 200 receives the signal).

A first demodulation decision based on a first framework is illustrated near the top of FIG. 4, with the framework shown on the left side and the demodulation decision shown on the right side. Each framework is viewed as including Tn, Tc, and Tp, where first framework includes the T1 portion of the signal being equivalent to Tn, the T0 portion of the signal being equivalent to Tc, and the T[−1] portion of the signal being equivalent to Tp. For the first demodulation decision, correlators (sequentially) receive the T[−1] and T0 portions of the signal and perform a first sampling iteration once receipt of the T0 portion is complete, resulting in a previous combined correlation result (W0X) based on Tc and Tp (or T0 and T[−1]). Correlators then receive the next T1 portion of the signal and a second sampling iteration is performed on the T0 and T1 portions of the signal once receipt of the T1 portion is complete, resulting in a future combined correlation result (W00) based on Tn and Tc (or T1 and T0). The previous and future combined correlation results are added (shown as an oval with a solid line), as discussed above, resulting in a present demodulation decision that returns the most likely symbol value for the current symbol S0 based on T1, T0, and T[−1] (shown as '0').

The framework shifts on receipt of the next T2 portion of the signal, illustrated in the next row of FIG. 4. The second framework includes the T2 portion of the signal being equivalent to Tn, the T1 portion of the signal being equivalent to Tc, and the T0 portion of the signal being equivalent to Tp. The future combined correlation result from the first framework is stored for a symbol duration period T and becomes the previous combined correlation result for the second framework (shown as an oval with a dashed line carrying the result over to the next framework by the arrow) based on Tc and Tp (or T1 and T0). Correlators perform another sampling iteration for the T2 and T1 portions of the signal, and a future combined correlation result is made (W10) based on Tn and Tc (or T2 and T1). The previous combined correlation result (WOO) and the future combined correlation result (W10) are added and a demodulation decision is generated that returns the most likely symbol value for the current symbol S1 based on T2, T1, and T0 portions of the signal ('0'). The framework shifts again on receipt of the next T3 portion of the signal, and the process repeats, as also shown in the remaining rows of FIG. 4.

Figure 5:
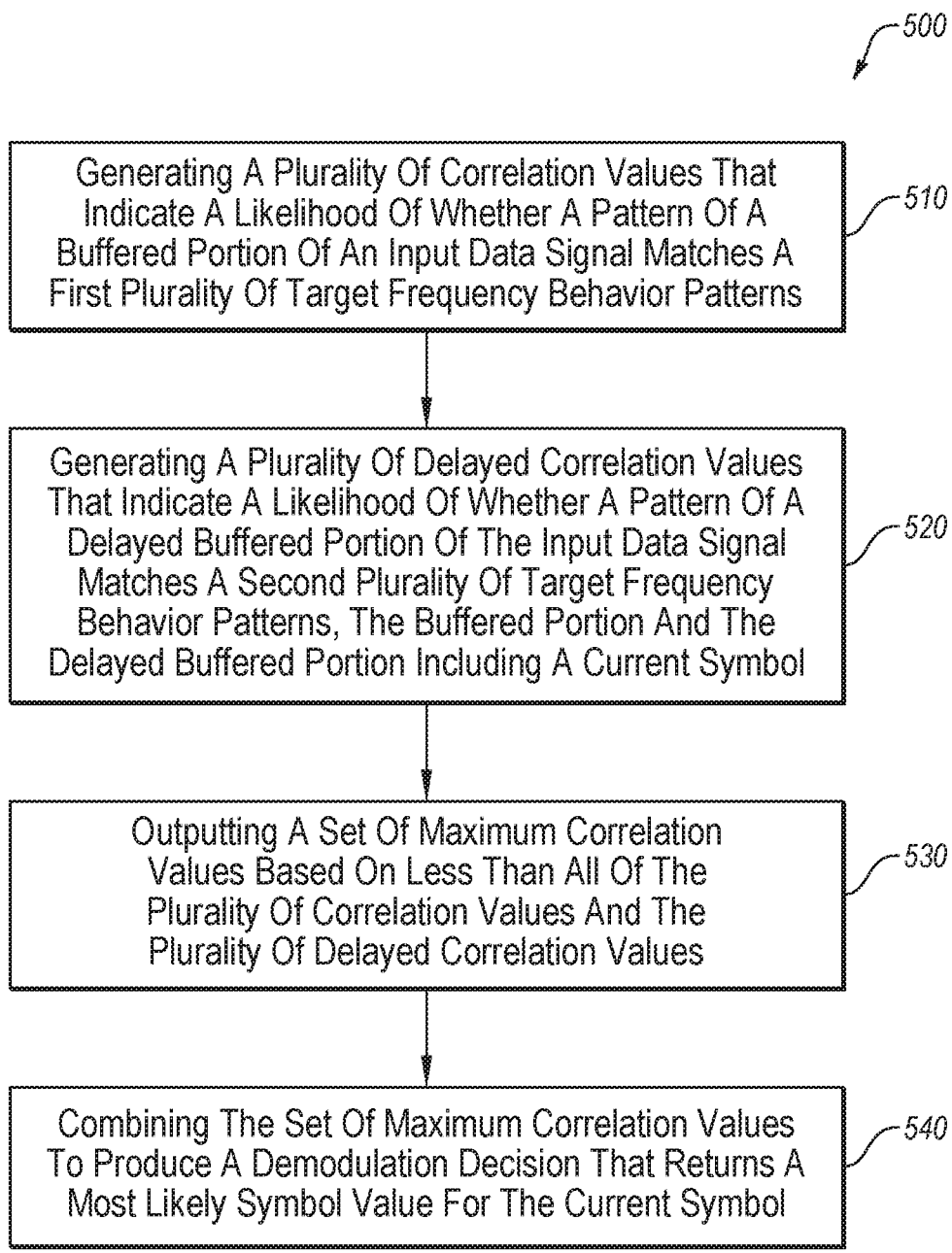
FIG. 5 illustrates a flowchart depicting an example demodulation process implemented by a demodulator, in accordance with embodiments described herein.

FIG. 5 illustrates a flowchart depicting an example demodulation process implemented by a demodulator, such as demodulator 200 of FIG. 2. The demodulation process 500 begins at operation 510, where correlators in a pattern matching stage are configured to receive the input data signal and perform pattern matching over a sampling period. Specifically, the correlators generate a plurality of correlation values that indicate a likelihood of whether a pattern of a buffered portion of an input data signal matches a first plurality of target frequency behavior patterns.

The demodulation process 500 continues at operation 520 where the correlators in a pattern matching stage generate a plurality of delayed correlation values that indicate a likelihood of whether a pattern of a delayed buffered portion of the input data signal matches a second plurality of target frequency behavior patterns. The buffered portion and the delayed buffered portion including a current symbol.

The demodulation process 500 continues at operation 530 where a result combining stage outputs a set of maximum correlation values based on less than all of the plurality of correlation values received in operation 510, and the plurality of delayed correlation values received in operation 520.

In one embodiment, the operation 530 for outputting a set of maximum correlation values further includes ignoring or excluding a value of the correlation values for ones of the first plurality of target frequency behavior patterns that correspond to invalid sequences to form the less than all of the plurality of correlation values, and ignoring or excluding a value of the delayed correlation values for ones of the second plurality of target behavior patterns that correspond to invalid sequences to form the less than all of the plurality of delayed correlation metrics. Further, the invalid sequences may be based on ones of the first plurality of target frequency behavior patterns and ones of the second plurality of target frequency behavior patterns matching invalid sequences of the input data signal when the input data signal has been spread with a spreading code.

In a second embodiment, the operation 530 for outputting a set of maximum correlation values further includes ignoring or excluding a value of the correlation values for ones of the first plurality of target behavior patterns and second target behavior patterns that correspond to invalid combinations of sequences to further form the less than all of the plurality of correlation values and the less than all of the plurality of the delayed correlation values. Further, the invalid combinations may be based on ones of the first plurality of target frequency behavior patterns and ones of the second plurality of target frequency behavior patterns matching invalid combinations of sequences of the input data signal when the input data signal has been spread with a spreading code. Yet further, the outputting may further include generating an index for each of the first and second target frequency behavior patterns, and determining the invalid combinations based on the combinations of the indexes.

In a third embodiment, the operation 530 for outputting a set of maximum correlation values further includes combining ones of the plurality of correlation values with ones of the plurality of delayed correlation values that form valid combinations of sequences, and outputting a set of maximum correlation values based on the ones of the plurality of correlation values with ones of the plurality of delayed correlation values that form valid combinations of sequences. Further, the invalid combinations may be based on ones of the first plurality of target frequency behavior patterns and ones of the second plurality of target frequency behavior patterns matching invalid combinations of sequences of the input data signal when the input data signal has been spread with a spreading code.

The demodulation process 500 continues at operation 540 where the set of maximum correlation values are combined to produce a demodulation decision that returns a most likely symbol value for the current symbol.

Figure 6:
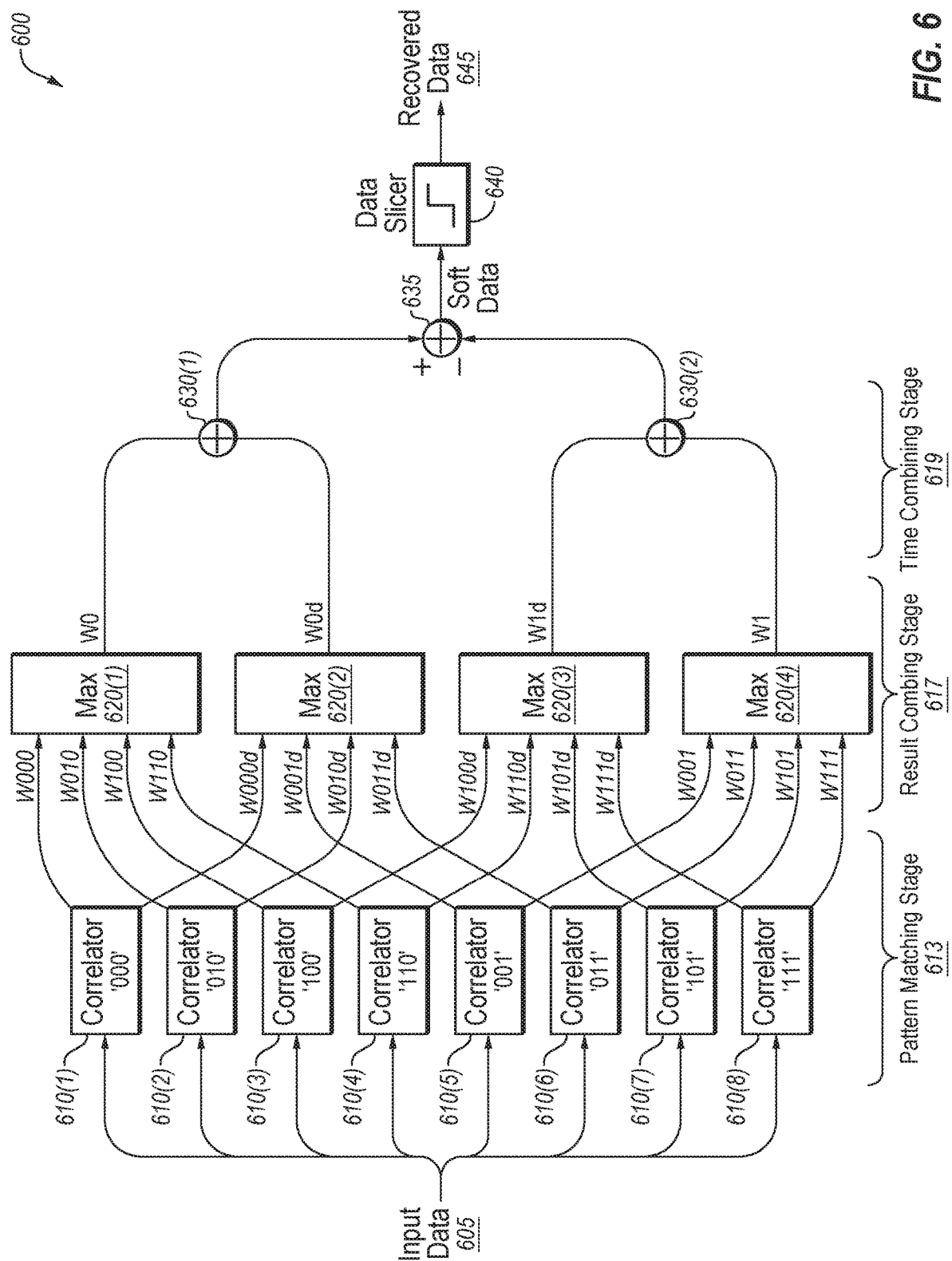
FIG. 6 illustrates a demodulator, in accordance with embodiments described herein.

In FIG. 6, a demodulator 600 includes correlation circuits 610(1)-(8), MAX selection blocks 620(1)-(4), adder blocks 630(1)-(2) and 635. The correlation circuits 610 form a pattern matching stage 613, MAX selection blocks 620 form a result combining stage 617, and adder blocks 630 and 635 form a time combining stage 619.

Demodulator 600 includes eight correlation circuits 610, each configured to detect a respective one of a number of target signals encoding one of the following triplets, for example, of reference symbols: 000, 001, 010, 011, 100, 101, 110, 111, which can be viewed in the receipt order of [Sn2][Sn1][Sc], where, or [Sc][Sp1][Sp2], where current symbols Sc: (1) a triplet of symbols that includes the current symbol Sc and two past symbols Sp1 and Sp2 (e.g., the past symbol Sp1 is the symbol immediately preceding the current symbol Sc, and the past symbol Sp2 is the symbol immediately preceding the past symbol Sp1), and (2) another triplet of symbols that includes the current symbol Sc and two next symbols Sn1 and Sn2 (e.g., the next symbols Sn1 is the symbol immediately following the current symbol Sc, and the next symbol Sn2 is the symbol immediately following the next symbol Sn1).

An input data signal 605 may be one of inphase signals or quadrature signals, as well as other domains. Further, while the illustrated demodulator includes eight correlators for processing three symbols, other numbers of correlators are contemplated including a lesser number for processing two symbols, or a greater number for processing a quantity of symbols greater than three. Yet further, the ordering of the symbols (e.g., "Wxyz") indicates the most recently received symbol is "x" with the symbol "z" being the symbol to be estimated by the correlator. Also, the symbols designated with a "d" (e.g., "Wxyzd") implies the symbol Wxyz was delayed, for example, by two symbol periods when the correlator is configured as illustrated in FIG. 6 to process three symbols. By including the delayed symbol sequences (e.g., Wxyzd) and the non-delayed symbol sequence (e.g., Wxyz), the correlation products of these sequences may be overlapped to identify the currently demodulated symbol (e.g., z).

In operations, as the input data signal 605 is received and passes through the correlation circuits 610(1)-(8), each correlation circuit 610 buffers and samples a past triplet that includes Sc, Sp1, and Sp2, as well as a next triplet that includes Sn2, Sn1, and Sc. The value of each correlator output is also used to produce a non delayed correlation metric (Wxyz) for the non delayed symbol sequence and a delayed correlation metric (Wxyzd) for the delayed symbol sequence. The correlation values (Wxyz, Wxyzd) of correlation circuits 610(1)-(8) are provided to MAX selection blocks 620(1)-(4), each of which receives four correlation values and selects a correlation metric having a greatest or largest magnitude from among the four correlation values output as a correlation result.

MAX 620(1) is configured to select a non delayed correlation metric that indicates a maximum likelihood of the current symbol having a symbol value of 0 based on the portion of the input data signal that includes the next triplet symbols Sn2, Sn1, and Sc. MAX 620(4) is configured to select a non delayed correlation metric that indicates a maximum likelihood of the current symbol having a symbol value of 1 based on the portion of the input data signal that includes the next triplet symbols Sn2, Sn1, and Sc. MAX 620(2) is configured to select a delayed correlation metric that indicates a maximum likelihood of the current symbol having a symbol value of 0 based on the portion of the input data signal that includes the past triplet symbols Sc, Sp1, and Sp2. MAX 620(3) is configured to select a delayed correlation metric that indicates a maximum likelihood of the current symbol having a symbol value of 1 based on the portion of the input data signal that includes the past triplet symbols Sc, Sp1, and Sp2.

The outputs of MAX selection block 620(1) and 620(2) are combined at adder block 630(1) to produce a first combined correlation result indicating the likelihood of the current symbol Sc having a symbol value of '0'. The outputs of MAX selection block 620(4) and 620(3) are combined at adder block 630(2) to produce a second combined correlation result indicating the likelihood of the current symbol Sc having a symbol value '1'. The outputs of adder blocks 630(1) and (2) are combined at adder block 635, which outputs the difference between the first and second combined correlation results as soft data, which indicates the most likely symbol value for the current symbol Sc. The sign of the soft data indicates a current symbol value of '0' (if positive) and '1' (if negative), although other mappings may be utilized in other embodiments, depending on how the combined correlation results are added in the demodulator. The soft data is provided to a data slicer 640, which detects the positive or negative value of soft data and outputs recovered data 645 accordingly.

As stated, the correlation products of the sequences may be overlapped to identify the currently demodulated symbol (e.g., z). For example, assume the symbol pattern "01011" was transmitted. The MAX correlations are likely to be W010 and W011d with the decision being made for the value of the "0" located in the center of the sequence. The analysis may include searching all possible patterns even though some of the sequence patterns are not possible. For example, if a spreading factor of two is used, then a logical value for a "1" could be transmitted as the sequence "0011" and the logical value for a "1" could be "1100." Therefore, symbol sequences that, when combined do not allow for the sequences "0011" and "1100," are not valid sequences and need not be considered. Further, including the invalid sequences in the demodulation process may introduce decision errors into the demodulation process.

For convenience in notation, a nomenclature is defined wherein the serial symbol configuration is denoted in decimal notation. For example, the five symbol pattern of "10011" may be formed from a combination of a first symbol pattern of "10<u>0</u>" and a second symbol pattern "<u>0</u>11", where the underlined symbols are in common. Further, the first symbol pattern "100" may be represented by the decimal value of "4" and the second symbol pattern "011" may be represented by the decimal value of "3." Accordingly, the combined nomenclature for the first and second symbol pattern may be written as "[4,3]". Further, a five symbol pattern yields $2^5$ or 32 possible combinations. As stated, other pattern lengths are also operable according to the principles described herein, and the five symbol pattern is merely illustrative.

As alluded to above, data may be subjected to spreading sequences, and an example of which is the spreading sequence used in the BLE 5.0 Bluetooth standard. By way of example, a spreading sequence may map a sequence of symbols to specific binary values, such as a "zero" value being mapped to the symbol sequence "0011" and the "one"

value being mapped to the symbol sequence "1100". Therefore, according to the spread sequences, there are some symbol patterns that are invalid and therefore not expected as a received sequence. For example, when the above spreading techniques are employed, the symbol sequence of "010" and "101" would be invalid and not expected at a receiver.

Continuing the above example with a five-bit sequence that includes three-bit combinations, the possible valid three-bit combination when:

the middle bit of a five-bit sequence is "0": [0,1], [0,3], [4,0], [4,3], [6,0], [6,1]

the middle bit of a five-bit sequence is "1": [1,6], [1,7], [3,4], [3,7], [7,4], [7,6].

Accordingly, in the five-bit sequence example, there are twelve (12) valid five-bit sequences out of a possible thirty-two (32) possible sequences. Therefore, 62.5% of the sequences result in sequences that are invalid in view of the above-defined spreading values. Accordingly, including these invalid sequences in the demodulation process may result in unnecessary errors.

Figure 7:
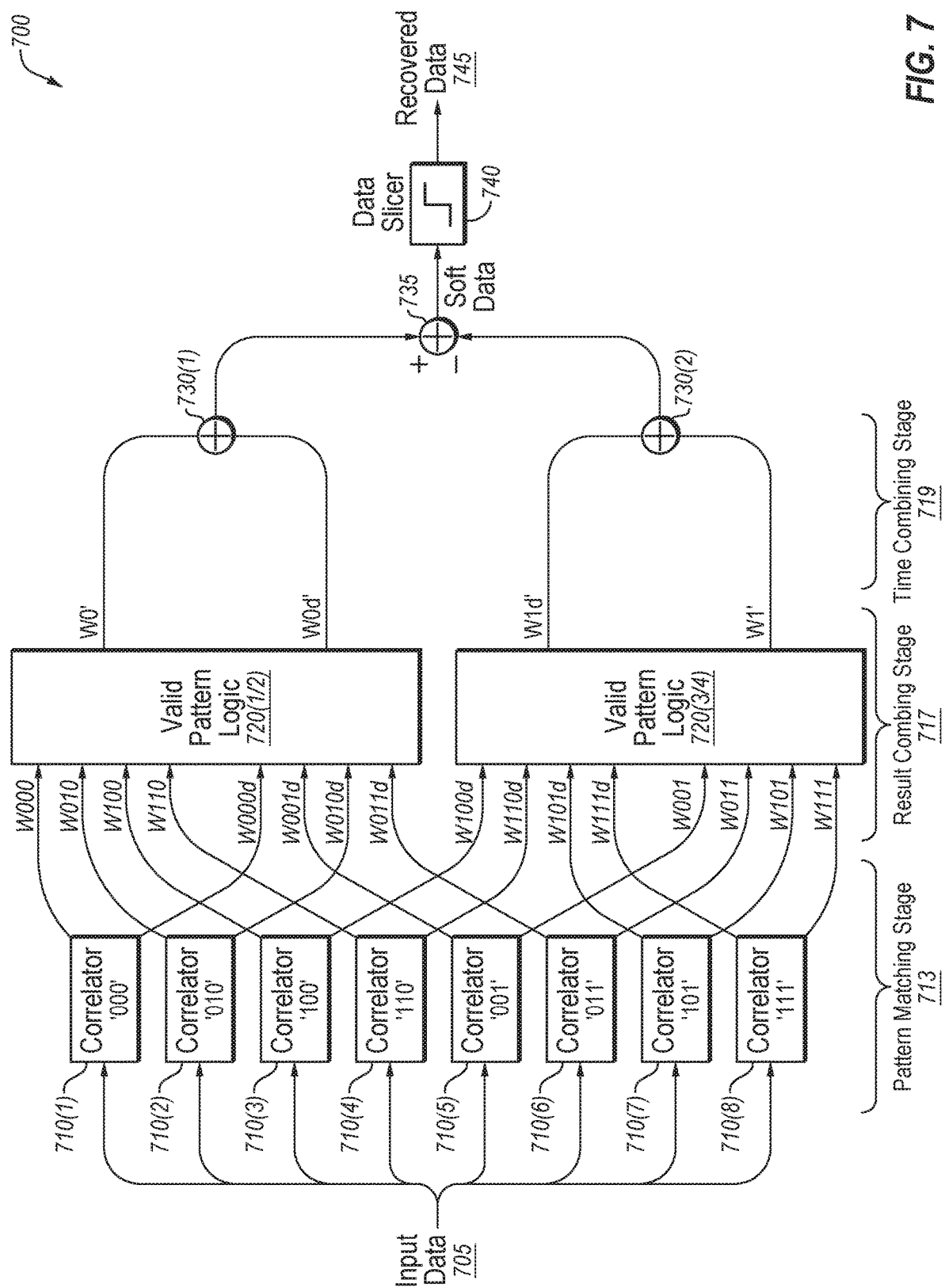
FIG. 7 illustrates a demodulator, in accordance with embodiments described herein.

FIG. 7 illustrates a demodulator 700 configured to filter-out invalid sequences by including MAX selection blocks, as described above, but the invalid sequences (e.g., "W010, W010d, W101, W101d) are forced to have a "zero" value. The demodulator 700 includes correlation circuits 710(1)-(8), valid pattern logic 720(1/2)-720(3/4), adder blocks 730(1)-(2) and 735. The correlation circuits 710 form a pattern matching stage 713, valid pattern logic 720 forms a result combining stage 717, and adder blocks 730 and 735 form a time combining stage 719.

Demodulator 700 includes eight correlation circuits 710, each configured to detect a respective one of a number of target signals encoding one of the following triplets of reference symbols: 000, 001, 010, 011, 100, 101, 110, 111, which can be viewed in the receipt order of [Sn2][Sn1][Sc], where, or [Sc][Sp1][Sp2], where current symbols Sc: (1) a triplet of symbols that includes the current symbol Sc and two past symbols Sp1 and Sp2 (e.g., the past symbol Sp1 is the symbol immediately preceding the current symbol Sc, and the past symbol Sp2 is the symbol immediately preceding the past symbol Sp1), and (2) another triplet of symbols that includes the current symbol Sc and two next symbols Sn1 and Sn2 (e.g., the next symbols Sn1 is the symbol immediately following the current symbol Sc, and the next symbol Sn2 is the symbol immediately following the next symbol Sn1).

An input data signal 705 may be one of inphase signals or quadrature signals, as well as other domains. Further, while the illustrated demodulator includes eight correlators for processing three symbols, other numbers of correlators are contemplated including a lesser number for processing two symbols, or a greater number for processing a quantity of symbols greater than three. Yet further and as stated above, the ordering of the symbols (e.g., "Wxyz") indicates the most recently received symbol is "x" with the symbol "z" being the symbol to be estimated by the correlator. Also, the symbols designated with a "d" (e.g., "Wxyzd") implies the symbol Wxyz delayed, for example, by two symbol periods when the correlator is configured as illustrated in FIG. 7 to process three symbols. By including the delayed symbol sequences (e.g., Wxyzd) and the non-delayed symbol sequence (e.g., Wxyz), the correlation products of these sequences may be overlapped to identify the currently demodulated symbol (e.g., z).

In operations, as the input data signal 705 is received and passes through the correlation circuits 710(1)-(8), each correlation circuit 710 buffers and samples a past triplet that includes Sc, Sp1, and Sp2, as well as a next triplet that includes Sn2, Sn1, and Sc. The correlation values (Wxyz, Wxyzd) of correlation circuits 710(1)-(8) are provided to valid pattern logic 720(1/2)-(3/4), each of which receives eight correlation values. The valid pattern logic 720 identifies the symbol sequences that are invalid and sets those values to "zero" to prevent injecting unnecessary errors into the symbol identification process. By way of example, the invalid sequences (e.g., "W010, W010d, W101, W101d) are forced to zero, since a spreading sequence may map a sequence of symbols to specific binary values, such as a "zero" value being mapped to the symbol sequence "0011" and the "one" value being mapped to the symbol sequence "1100". Therefore, according to the spread sequences, there are some symbol patterns that are invalid and therefore not expected as a received sequence. For example, when the above spreading techniques are employed, the symbol sequence of "010" and "101" would be invalid and not expected at a receiver.

With the invalid symbol sequences forced to a minimum value, the valid pattern logic 720(1/2)-(3/4) selects a non delayed correlation metric and a delayed correlation metric each having a greatest or largest magnitude from among the four correlation values, which are output as a correlation result.

Valid pattern logic 720 (1/2) is configured to select a correlation metric that indicates a maximum likelihood of the current symbol having a symbol value of 0 based on the portion of the input data signal that includes the next triplet symbols Sn2, Sn1, and Sc and to select a correlation metric that indicates a maximum likelihood of the current symbol having a symbol value of 0 based on the portion of the input data signal that includes the past triplet symbols Sc, Sp1, and Sp2. Valid pattern logic 720(3/4) is configured to select a correlation metric that indicates a maximum likelihood of the current symbol having a symbol value of 1 based on the portion of the input data signal that includes the past triplet symbols Sc, Sp1, and Sp2, and to select a correlation metric that indicates a maximum likelihood of the current symbol having a symbol value of 1 based on the portion of the input data signal that includes the next triplet symbols Sc, Sp1, and Sp2.

The outputs of valid pattern logic 720(1/2) are combined at adder block 730(1) to produce a first combined correlation result indicating the likelihood of the current symbol Sc having a symbol value of '0'. The outputs of valid pattern logic 720(3/4) are combined at adder block 730(2) to produce a second combined correlation result indicating the likelihood of the current symbol Sc having a symbol value '1'.

The outputs of adder blocks 730(1) and (2) are combined at adder block 735, which outputs the difference between the first and second combined correlation results as soft data, which indicates the most likely symbol value for the current symbol Sc. The sign of the soft data indicates a current symbol value of '0' (if positive) and '1' (if negative), although other mappings may be utilized in other embodiments, depending on how the combined correlation results are added in the demodulator. The soft data is provided to a data slicer 740, which detects the positive or negative value of soft data and outputs recovered data 745 accordingly.

As stated, the correlation products of the sequences may be overlapped to identify the currently demodulated symbol (e.g., z). For example, assume the symbol pattern "01011" was transmitted. The maximum correlations are likely to be W010 and W011d with the decision being made for the value of the "0" located in the center of the sequence. The analysis may include setting the maximum value of the symbol sequence W010 to "zero" or a minimum value since the sequence "010" is an invalid sequence when, for example, the spreading code identified herein is used. Therefore, symbol sequences that, when combined do not allow for the sequences "0011" and "1100," are not valid sequences and need not be considered. As stated, including the invalid sequences in the demodulation process may introduce decision errors into the demodulation process.

Figure 8:
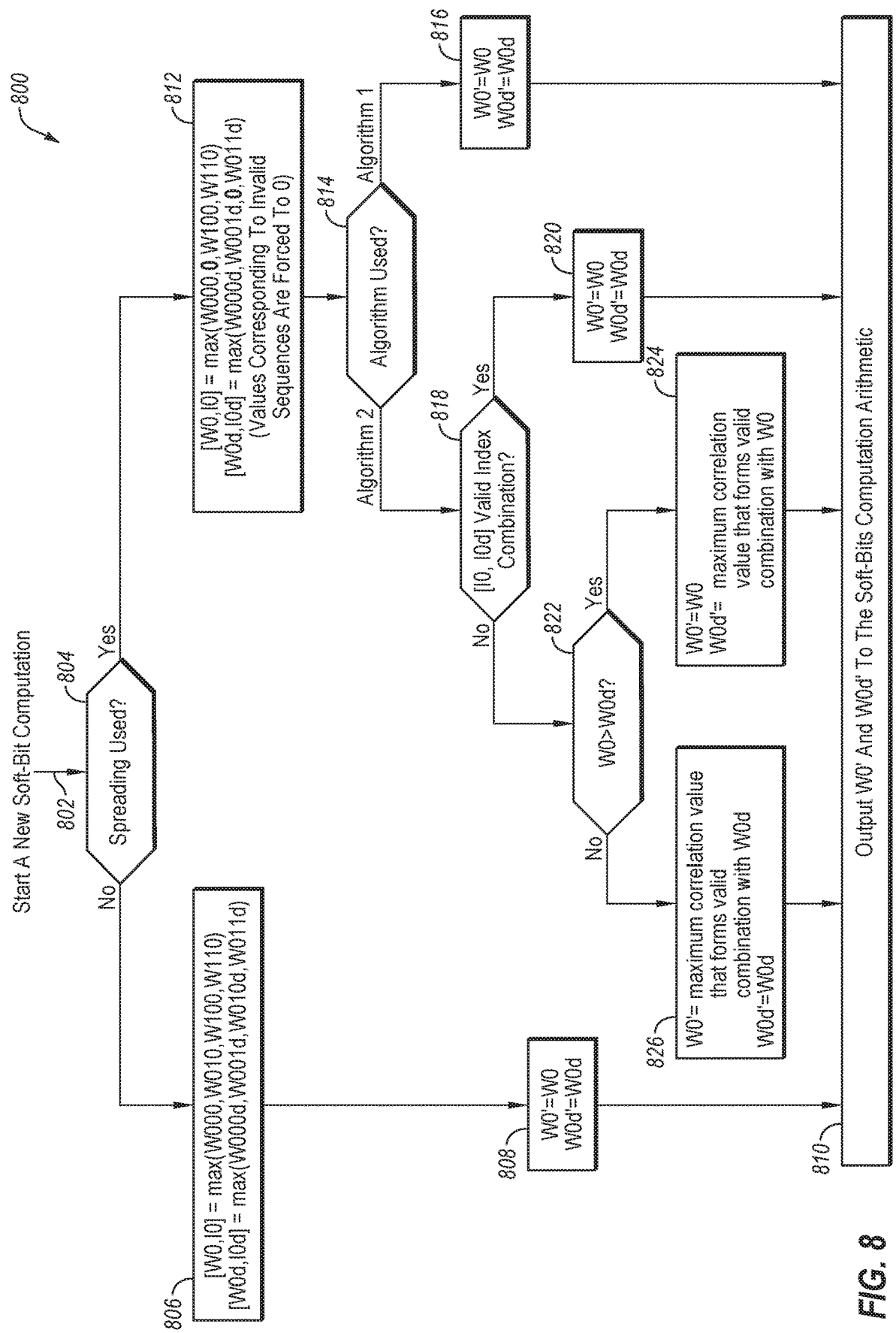
FIG. 8 illustrates a flowchart of operations within the valid pattern logic of FIG. 7, in accordance with embodiments described herein.

FIG. 8 illustrates a flowchart of operations within the valid pattern logic of FIG. 7. Generally, a first algorithm may identify invalid partial correlation sequences and set the invalid sequence correlation values to "zero" or a minimal value to minimize inserting errors into the demodulation process. By way of example, identifying invalid partial correlation sequences for a five-bit sequence identified from three-bit sequences, results in six valid three-bit sequences out of eight possible three-bit sequences.

Also, a second algorithm may be implemented which includes the first algorithm and further identifies invalid combinations of three-bit sequences used to form a five-bit combination. By way of example, identifying invalid combinations of three-bit sequences results in the identification of 62.5% of all possible combinations of sequences being invalid combinations, which may result in a significant reduction in processing and a reduction in the potential for introducing unnecessary errors into the demodulation process.

The flowchart 800 of FIG. 8 illustrates the process for reducing computations and reducing error insertions based on demodulation using a first or second algorithm. The flowchart of FIG. 8 is illustrated for a correlated "0", however, the process is also duplicated for processing a correlated "1".

A step 802 initiates the computation of a bit in a sequence by first determining at a query step 804 whether spreading techniques are employed. As stated above, spreading techniques result in specific sequencing of symbols that are valid for specific bits. Accordingly, invalid sequences may be identified and determined that may result in reduced computational needs in the demodulator. When no spreading has been employed in the modulation, then processing passes to step 806 wherein the output is a maximum correlation metric W0 equal to the maximum (MAX) of one of the correlation values W000, W010, W100, W110, with an Index I0 corresponding to the index of the selected one of the maximum correlation metric.

Further, the maximum delayed correlation metric W0d is equal to the maximum (MAX) of one of the delayed correlation values W000d, W010d, W100d, W110d, with an Index I0d corresponding to the index of the selected one of the maximized delayed correlation values. In a step 808 an adjusted maximum correlation metric W0' is assigned the maximum correlation metric W0, generated by the valid pattern logic 720 (1/2) of FIG. 7. Similarly, an adjusted maximum delayed correlation metric W0d' is assigned the maximum delayed correlation metric W0d, generated by the valid pattern logic 720 (1/2) of FIG. 7. The adjusted maximum correlation metric and the adjusted maximum delayed correlation metric W0d' are then output at a step 810 to the adders 730 and 735 for generating the soft data for value determination by the data slicer 740.

When the query step 804 determines that spreading codes were used to modulate the input data signal, then the processing passes to a step 812 where the above first or second algorithms may reduce the computation and associated errors by foregoing processing of known invalid sequences and combinations of sequences. The step 812 calculates a maximum correlation metric W0 by performing a maximum operation on the correlation values from the correlation circuits that include a "0" in the position of the symbol to be determined. For example, the maximum correlation metric may be determined from among the correlation values W000, W100, and W110, with the correlation metric for W010 being set to "zero" or a minimum value since the particular spreading code (i.e., where a "0" is spread to a coding of "0011" and a "F" is spread to a coding of "1100") does not generate a valid sequence of "010" for correlation. The index I0 of the maximum is recorded.

Similarly, a step 812 also calculates a maximum delayed correlation metric W0d by performing a maximum operation on the correlation values from the correlation circuits that include a "0" in the position of the symbol to be determined. For example, the maximum correlation metric may be determined from among the correlation values W000d, W001d, and W011d, with the correlation metric for W010d being set to "zero" or a minimum value since the particular spreading code (i.e., where a "0" is spread to a coding of "0011" and a "1" is spread to a coding of "1100") does not generate a valid sequence of "010." The index I0d of the maximum is recorded.

A query step 814 is performed after the maximum correlation metric of W0, I0, W0d, and I0d are determined. In query step 814 a decision regarding which of the first or second algorithms is used. When a first algorithm is to be used, in a step 816, an adjusted maximum correlation metric W0' is assigned the maximum correlation metric W0, generated by the valid pattern logic 720 (1/2) of FIG. 7. Similarly, an adjusted maximum delayed correlation metric W0d' is assigned the maximum delayed correlation metric W0d, generated by the valid pattern logic 720 (1/2) of FIG. 7. The adjusted maximum correlation metric W0' and the adjusted maximum delayed correlation metric W0d' are then output at a step 810 to the adders 730 and 735 for generating the soft data for value determination by the data slicer 740.

When the query step 814 determines a second algorithm is to be used, then a query step 818 determines if a valid combination is formed by a combination of the indexes, I0 and I0d, from the maximum correlation values, W0 and W0d, as described above with reference to FIG. 7.

When the indexes I0 and I0d are determined to form a valid combination of the sequences, then in a step 820, an adjusted maximum correlation metric W0' is assigned the maximum correlation metric W0, generated by the valid pattern logic 720 (1/2) of FIG. 7. Similarly, an adjusted maximum delayed correlation metric W0d' is assigned the maximum delayed correlation metric W0d, generated by the valid pattern logic 720 (1/2) of FIG. 7. The adjusted maximum correlation metric and the adjusted maximum delayed correlation metric W0d' are then output at a step 810 to the adders 730 and 735 for generating the soft data for value determination by the data slicer 740.

When the indexes I0 and I0d are determined to not form a valid combination of the sequences, then a query step 822 determines which of the maximum correlation values of W0 or W0d has the greatest correlation value. Generally, the one of the maximum correlation metric W0 or the maximum delayed correlation metric W0d that has the greatest correlation value is retained the other one is replaced by the next maximum correlation metric that results in a valid combination of the indexes. The adjusted maximum correlation metric W0' and the adjusted maximum delayed correlation metric W0d' are then output at a step 810 to the adders 730 and 735 for generating the soft data for value determination by the data slicer 740.

When the query step 822 determines the maximum correlation values of W0 is not greater than the maximum delayed correlation metric W0d, then the maximum delayed correlation metric W0d is retained and the maximum correlation metric W0 is replaced by the next maximum correlation metric that results in a valid combination of the indexes. The adjusted maximum correlation metric W0' and the adjusted maximum delayed correlation metric W0d' are then output at a step 826 to the adders 730 and 735 for generating the soft data for value determination by the data slicer 740.

Figure 9:
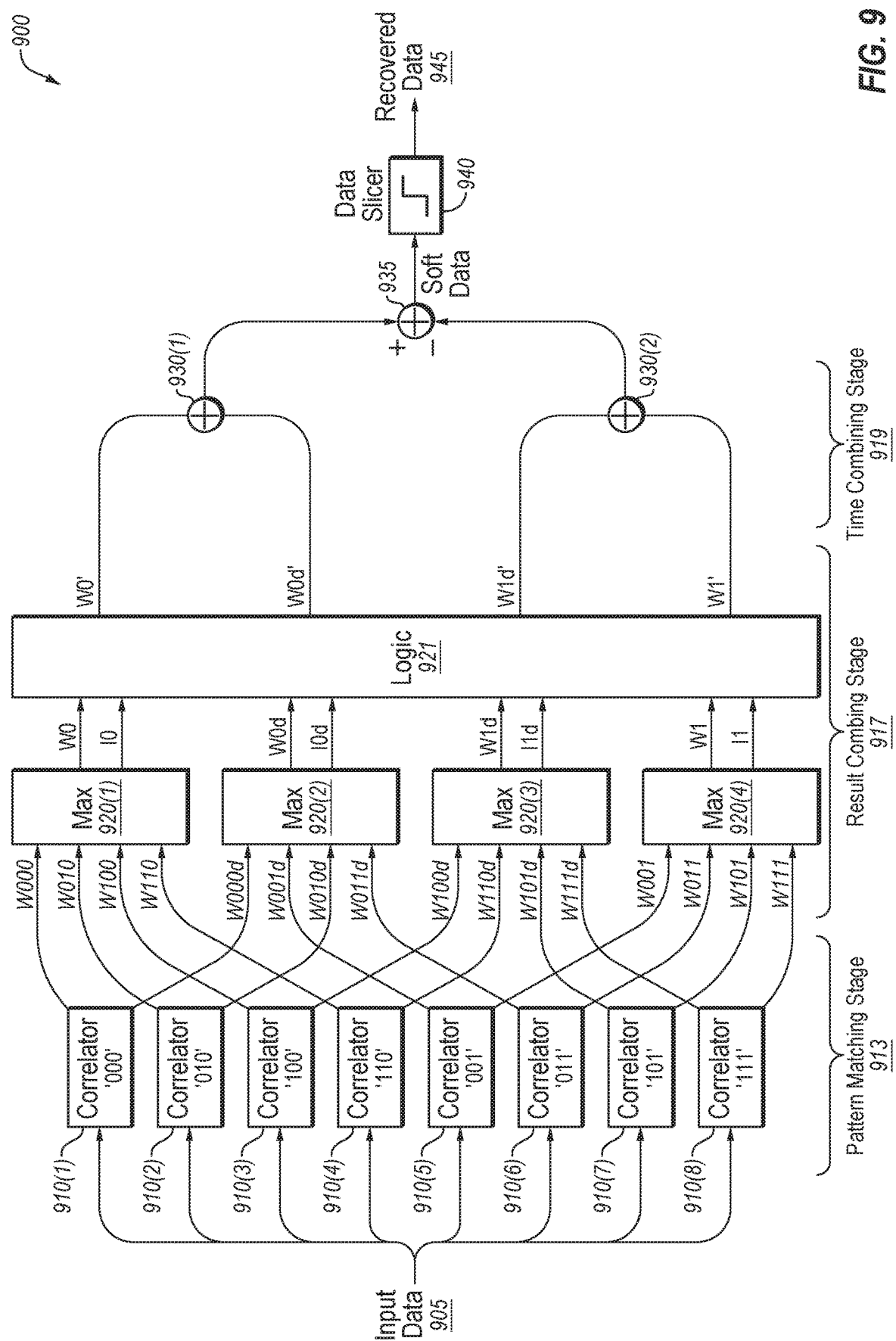
FIG. 9 illustrates a demodulator, in accordance with embodiments described herein.

FIG. 9 illustrates a demodulator 900 configured to operate in accordance with the flowchart of FIG. 8. Specifically, the demodulator 900 is configured to filter-out invalid sequences and combinations of sequences. The demodulator 900 includes correlation circuits 910(1)-(8), MAX selection blocks 920(1)-(4), valid pattern logic 921, adder blocks 930(1)-(2) and 935. The correlation circuits 910 form a pattern matching stage 913, MAX selection blocks 920 and valid pattern logic 921 form a result combining stage 917 where invalid symbol sequences and invalid combinations of sequences are processed, delay blocks 925 and adder blocks 930 and 935 form a time combining stage 919.

Demodulator 900 includes eight correlation circuits 910, like the correlation circuits 210, 610, and 710 described above.

In operations, as the input data signal 905 is received and passes through the correlation circuits 910(1)-(8), each correlation circuit 910 buffers and samples a past triplet that includes Sc, Sp1, and Sp2, as well as a next triplet that includes Sn2, Sn1, and Sc. The correlation values of correlation circuits 910(1)-(8) are provided to MAX selection blocks 920(1)-(4), each of which receives four correlation values and selects a correlation metric having a greatest or largest magnitude from among the four correlation values, which is output as a correlation result.

MAX selection blocks 920(1) is configured to select a correlation metric that indicates a maximum likelihood of the current symbol having a symbol value of "0" based on the portion of the input data signal that includes the next triplet symbols Sn2, Sn1, and Sc. The maximum correlation metric W0 and the index I0 of the sequence having the maximum metric are output to the valid pattern logic 921. MAX selection block 920(4) is configured to select a correlation metric that indicates a maximum likelihood of the current symbol having a symbol value of "1" based on the portion of the input data signal that includes the next triplet symbols Sn2, Sn1, and Sc. The maximum correlation metric W1 and the index I1 of the sequence having the maximum metric are output to the valid pattern logic 921. MAX selection block 920(2) is configured to select a correlation metric that indicates a maximum likelihood of the current symbol having a symbol value of "0" based on the portion of the input data signal that includes the past triplet symbols Sc, Sp1, and Sp2. The maximum correlation metric W0d and the index I0d of the sequence having the maximum metric are output to the valid pattern logic 921. MAX selection block 920(3) is configured to select a correlation metric that indicates a maximum likelihood of the current symbol having a symbol value of "1" based on the portion of the input data signal that includes the past triplet symbols Sc, Sp1, and Sp2. The maximum correlation metric W1d and the index I1d of the sequence having the maximum metric are output to the valid pattern logic 921.

The valid pattern logic 921 receives the maximum correlation values and respective sequence indexes and carries out the steps or circuit illustrated in the flowchart of FIG. 8. The adjusted maximum correlation metric W0' and the adjusted maximum correlation metric W0d', and the adjusted maximum correlation metric W1' and the adjusted maximum delayed correlation metric W1d' are then output at a step 810 (FIG. 8) to the adders 930 and 935 for generating the soft data for value determination by the data slicer 940.

Figure 10:
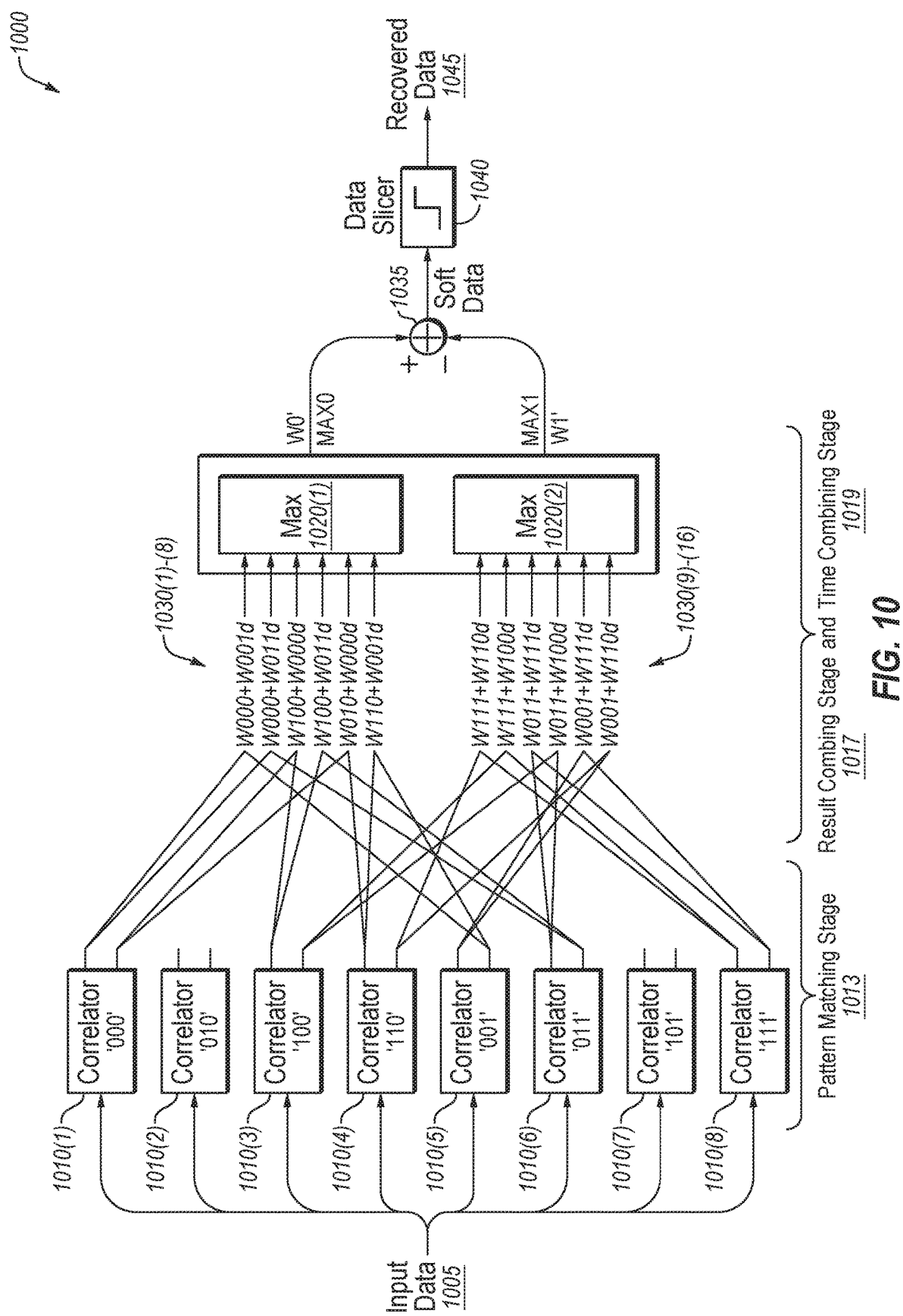
FIG. 10 illustrates a demodulator, in accordance with embodiments described herein.

FIG. 10 illustrates a demodulator 1000 configured to operate in accordance with a third algorithm. Specifically, the demodulator 1000 is configured to first combine valid sequence combinations of the correlation metric and the delayed correlation metric and then select a maximum combined correlation from the valid sequence combinations. The demodulator 1000 includes correlation circuits 1010(1)-(8) (like the correlation circuits 210, 10, 710, and 910, adder blocks 1030 (1)-(16), MAX selection blocks 1020(1)-(2), and adder block 1035. The correlation circuits 1010 form a pattern matching stage 1013, the adder blocks 1030 (1)-(16) combine the correlator values for the valid combinations of sequences and the MAX selection blocks 1020 form a result combining stage 1017, and a time combining stage 1019. It is noted that the outputs of correlation circuits for invalid sequences are not used in any of the combinations and combinations that result in invalid combinations are also not provided to the MAX selection blocks for analysis.

The demodulation algorithm illustrated in FIG. 10 may be summarized by the following:

MAX0=MAX($W000+W001d, W000+W011d, W100+W000d, W100+W011d, W110+W000d, W110+W001d$)

MAX1=MAX($W111+W110d, W111+W100d, W011+W111d, W011+W100d, W001+W111d, W001+W110d$).

This third algorithm is in contrast to the first algorithm which can be summarized by the following:

MAX($W111, W011, W001$)+MAX($W111d, W110d, W100d$).

Accordingly, a demodulator may be improved by utilizing invalid sequences and/or invalid combinations of sequences during the demodulation process. Identification of invalid sequences and combinations of sequences reduces the processing requirements, circuit area, and errors associated with processing sequences and combinations of sequences that are received in error.

The demodulation improvements described herein apply to wireless protocols using spreading for coding gains, such as Bluetooth BLE 5.0. In such embodiments, a receiver may include a cascade of a demodulator and soft bit de-spreader. In other words, in such embodiments the demodulator generates soft bits that are later de-spread to realize the coding gain. The embodiments may provide an enhanced correlation-based symbol demodulator that exploits the spreading bit patterns in the transmitted data to correct errors. One improvement of the disclosed embodiments improves the coding gain observed after the de-spreader. A second improvement may be that the demodulator may also be used with wireless protocols that do not rely on spreading gain, so it has general applicability. The methods used in the embodiments are exemplified for the case of BLE 5, but it is programmable to handle other protocols that use spreading such as IEEE standard 802.15.4.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

The invention claimed is:

1. A frequency shift keying (FSK) demodulator, comprising:
   a plurality of correlation circuits configured to output a plurality of correlation values that indicate a likelihood of whether a pattern of a buffered portion of an input data signal matches a first plurality of target frequency behavior patterns, and configured to output a plurality of delayed correlation values that indicate a likelihood of whether a pattern of a delayed buffered portion of the input data signal matches a second plurality of target frequency behavior patterns, the buffered portion and the delayed buffered portion including a current symbol;
   a result combining stage coupled to the plurality of correlation circuits, the result combining stage configured to output a set of maximum correlation values based on less than all of the plurality of correlation values and the plurality of delayed correlation values; and
   a time combining stage coupled to the result combining stage, the time combining stage configured to combine the set of maximum correlation values to produce a demodulation decision that returns a most likely symbol value for the current symbol.

2. The FSK demodulator of claim 1, wherein the result combining stage is configured to:
   ignore a value of the correlation values for ones of the first plurality of target behavior patterns that correspond to invalid sequences to form the less than all of the plurality of correlation values; and
   ignore a value of the delayed correlation values for ones of the second plurality of target behavior patterns that correspond to invalid sequences to form the less than all of the plurality of delayed correlation metrics.

3. The FSK demodulator of claim 2, wherein the invalid sequences are based on ones of the first plurality of target frequency behavior patterns and ones of the second plurality of target frequency behavior patterns matching invalid sequences of the input data signal when the input data signal has been spread with a spreading code.

4. The FSK demodulator of claim 2, wherein the result combining stage is further configured to:
   ignore a value of the correlation values for ones of the first plurality of target behavior patterns and second target behavior patterns that correspond to invalid combinations of sequences to further form the less than all of the plurality of correlation values and the less than all of the plurality of the delayed decorrelation values.

5. The FSK demodulator of claim 4, wherein the invalid combinations are based on ones of the first plurality of target frequency behavior patterns and ones of the second plurality of target frequency behavior patterns matching invalid combinations of sequences of the input data signal when the input data signal has been spread with a spreading code.

6. The FSK demodulator of claim 4, wherein the result combining stage further generates an index for each of the first and second target frequency behavior patterns, and determines the invalid combinations based on the combinations of the indexes.

7. The FSK demodulator of claim 1, wherein the result combining stage is further configured to:
   combine ones of the plurality of correlation values with ones of the plurality of delayed correlation values that form valid combinations of sequences; and
   output a set of maximum correlation values based on the ones of the plurality of correlation values with ones of the plurality of delayed correlation values that form valid combinations of sequences.

8. The FSK demodulator of claim 7, wherein the invalid combinations are based on ones of the first plurality of target frequency behavior patterns and ones of the second plurality of target frequency behavior patterns matching invalid combinations of sequences of the input data signal when the input data signal has been spread with a spreading code.

9. A method of demodulating, comprising:
   generating a plurality of correlation values that indicate a likelihood of whether a pattern of a buffered portion of an input data signal matches a first plurality of target frequency behavior patterns;
   generating a plurality of delayed correlation values that indicate a likelihood of whether a pattern of a delayed buffered portion of the input data signal matches a second plurality of target frequency behavior patterns, the buffered portion and the delayed buffered portion including a current symbol;
   outputting a set of maximum correlation values based on less than all of the plurality of correlation values and the plurality of delayed correlation values; and
   combining the set of maximum correlation values to produce a demodulation decision that returns a most likely symbol value for the current symbol.

10. The method of claim 9, wherein the outputting a set of maximum correlation values further comprises:
    excluding a value of the correlation values for ones of the first plurality of target frequency behavior patterns that correspond to invalid sequences to form the less than all of the plurality of correlation values; and
    excluding a value of the delayed correlation values for ones of the second plurality of target behavior patterns that correspond to invalid sequences to form the less than all of the plurality of delayed correlation metrics.

11. The method of claim 10, wherein the invalid sequences are based on ones of the first plurality of target frequency behavior patterns and ones of the second plurality of target frequency behavior patterns matching invalid sequences of the input data signal when the input data signal has been spread with a spreading code.

12. The method of claim 10, wherein the outputting further comprises:
excluding a value of the correlation values for ones of the first plurality of target behavior patterns and second target behavior patterns that correspond to invalid combinations of sequences to further form the less than all of the plurality of correlation values and the less than all of the plurality of the delayed correlation values.

13. The method of claim 12, wherein the invalid combinations are based on ones of the first plurality of target frequency behavior patterns and ones of the second plurality of target frequency behavior patterns matching invalid combinations of sequences of the input data signal when the input data signal has been spread with a spreading code.

14. The method of claim 12, wherein the outputting further comprises:
generating an index for each of the first and second target frequency behavior patterns; and
determining the invalid combinations based on the combinations of the indexes.

15. The method of claim 9, wherein the outputting further comprises:
combining ones of the plurality of correlation values with ones of the plurality of delayed correlation values that form valid combinations of sequences; and
outputting a set of maximum correlation values based on the ones of the plurality of correlation values with ones of the plurality of delayed correlation values that form valid combinations of sequences.

16. The method of claim 15, wherein the invalid combinations are based on ones of the first plurality of target frequency behavior patterns and ones of the second plurality of target frequency behavior patterns matching invalid combinations of sequences of the input data signal when the input data signal has been spread with a spreading code.

17. A frequency shift keying (FSK) demodulator, comprising:
a plurality of correlation circuits configured to receive an input data signal spread by a spreading code, each of the plurality of correlation circuits configured to generate a correlation metric and a delayed correlation metric respectively representing a likelihood of a match of a pattern of a buffered portion of the input data signal with a first target frequency behavior pattern and of a pattern of a delayed buffered portion of the input data signal with a second target frequency behavior pattern, the buffered portion and the delayed buffered portion including a current symbol;
a result combining stage coupled to the plurality of correlation circuits, the result combining stage configured to output a set of maximum correlation values based on less than all of the plurality of correlation values and the plurality of delayed correlation values; and
a time combining stage coupled to the result combining stage, the time combining stage configured to combine the set of maximum correlation values to produce a demodulation decision that returns a most likely symbol value for the current symbol.

18. The FSK demodulator of claim 17, wherein the result combining stage is configured to:
determine valid sequences of the first plurality of target behavior patterns based on the spreading code; and
determine valid sequences of the second plurality of target behavior patterns based on the spreading code.

19. The FSK demodulator of claim 18, wherein the result combining stage is further configured to:
determine valid combinations of sequences of ones of the first plurality of target behavior patterns and second target behavior patterns that correspond to valid combinations of sequences.

20. The FSK demodulator of claim 17, wherein the result combining stage is configured to:
combine ones of the plurality of correlation values with ones of the plurality of delayed correlation values that form valid combinations of sequences; and
output a set of maximum correlation values based on the ones of the plurality of correlation values with ones of the plurality of delayed correlation values that form valid combinations of sequences.

* * * * *